United States Patent Office 3,029,222
Patented Apr. 10, 1962

3,029,222
INTERPOLYMERS OF METHYL METHACRYLATE, ALPHA-METHYLSTYRENE AND BUTADIENE ELASTOMERS AND PROCESS OF PREPARING THE SAME
Joseph Briskin, 7 N. 13th St., Easton, Pa.
No Drawing. Filed Sept. 22, 1958, Ser. No. 762,284
5 Claims. (Cl. 260—45.5)

This invention relates to new interpolymers of methyl methacrylate, alpha-methylstyrene, and elastomers which have superior properties to previously known polymers of methyl methacrylate or alpha-methylstyrene and copolymers of these polymerizable materials. Methods of preparing these novel interpolymers are also included within the scope of the invention.

Polymers of methyl methacrylate are of limited hardness and are of low heat and mar resistance. Cross linking leads to increased brittleness and yields products which are difficult or impossible to mold. Solid polymers of alpha-methylstyrene are brittle and cannot be molded. Copolymers of methyl methacrylate and alpha-methylstyrene which have been described in the literature are of low molecular weight and have poor strength, toughness and heat and mar resistance.

The new polymers of the present invention are superior in that they have a high impact strength which is maintained over a long period of time and show more resistance to breakage from blows and other shocks than known copolymers of methyl methacrylate and alpha-methylstyrene. In addition, the resilience of the new interpolymers is improved so that considerable flexural deformations can be applied without fracture occurring. The new interpolymers of the present invention have higher heat distortion values than commercially available interpolymers of methyl methacrylate and butadiene. They are essentially transparent. Improvements in these and other important properties extend the uses to which interpolymers of this class can be put.

In order that the nature of the present invention may be more clearly understood, reference is made to a number of examples of the new compositions.

Example I

Seventy-five parts by weight of methyl methacrylate, 25 parts by weight of alpha-methylstyrene, 0.2 part by weight of benzoyl peroxide and 0.2 part by weight of tertiary dodecyl mercaptan were mixed and 10 parts by weight of an elastomer, a polymerized butadiene sold as Pliolite 2104, was dissolved in the mixture. The material was then charged into a clean glass bottle and the vapor space above the liquid was flushed with nitrogen and the bottle was sealed. Polymerization was allowed to take place for four days at 95° C. and then for three more days at 115° C. The unpolymerized monomers were removed from the interpolymer by extruding the composition through a small orifice at about 460° F. and applying vacuum to a vent in the extruder.

When the interpolymer was ground and compression molded into ½ x ½ x 5 inch bars, it had the following physical properties:

ASTM heat distortion, D648–56__. 113.5–115° C.
Notched Izod impact
    strength, D–256–56_____ 1.08–1.20 foot pounds
                                  per inch.

A compression molded sheet, about 1/16 inch thick, had a light transmission of 75–78 percent at a wave length of 550 millimicrons (5500 Angstroms), the region of maximum visbility of the human eye. In appearance, the molded sheet was essentially transparent, with a slight yellow-brown color. It was possible to drive a nail into this sheet without any splitting of the material, so that the nail was firmly held in place. In addition, cylindrical shaped strands of the interpolymer could be cut or machined very readily into pointed nails which could be driven through thick sections of wood without damage to the interpolymer nail.

The injection moldability of the material was easily demonstrated using a 1-ounce injection molding machine set at 470° F. and at 14,700 pounds per square inch pressure to produce ½ x ¼ x 5 inch test specimens.

When tested for notched Izod impact strength, the bars gave a value of 1.02±.02 foot pounds per inch. Flexural strength measurements using ASTM Method D–790–49T gave a value of 11,300±200 pounds per square inch.

Other compression molded test specimens gave the following results:

Specific gravity_____ 1.135
Rockwell hardness, ASTM method
    D–785–51 _____ M78–M80

Variations in the composition of the interpolymer may, of course, be made as well as variations in the polymerization procedure. The polymerization is preferably caused to take place in the range of 90° C. to about 115° C. with higher temperatures being used at the end of the polymerization. Higher temperatures speed up the polymerization; but because of the relatively low boiling points of the monomers, the temperature should not be so high as to result in volatilization of the essential components. Temperatures lower than 90° C. may also be used, but the polymerization period becomes excessively long for economic manufacture.

The benzoyl peroxide which is used as a polymerization catalyst can be replaced by other peroxides which are known to catalyze the polymerization of methyl methacrylate or alpha-methylstyrene. Among these are tertiary butyl hydroperoxide and di-tertiary butyl peroxide. Still other catalysts such as the persulfates, ozonides, diazotates, hydrazines, diazonium salts, amine oxides and others may be used as polymerization catalysts. In fact, the polymerization can be carried out without the aid of a catalytic agent, if desired. Amounts of the catalyst from 0.01 percent to 0.8 percent by weight are usually employed.

Various aliphatic mercaptans may be used in place of tertiary dodecyl mercaptan as stabilizers or regulators of the polymerization. Similarly, a number of organic disulfides of the formula R—S—S—R' in which R and R' are alkyl radicals of one to sixteen carbon atoms or aryl radicals such as phenyl, tolyl, parachlorophenyl, naphthyl and aralkyl radicals such as benzyl may also be used to give superior interpolymers. These polymerization regulators and polymer stabilizers may be used in amounts of from 0.01 to about 2 parts by weight of the polymerization mixture. In addition to regulating the polymerization, these mercaptans and disulfides appear to increase the resistance of the interpolymer to thermal degradation.

The preferred elastomer for use in practicing the present invention is polymerized butadiene. However, as will be seen hereinafter, elastomers made by copolymerizing styrene or methyl methacrylate with butadiene may also be used to impart special properties to the product. The amount of elastomer may vary from 1 to 20 percent by weight of the polymerization mixture. Although 10 percent by weight gives the best products under usual conditions, amounts between 5 and 15 percent by weight of the elastomer based on the total weight of the methyl methacrylate and alpha-methylstyrene monomer mixture give excellent interpolymers.

The relative proportions of methyl methacrylate to alpha-methylstyrene may range from 1 to 55 parts by weight of alpha-methylstyrene for each 100 parts by weight of the mixture, the remaining 99 to 45 parts by weight being, of course, methyl methacrylate. We prefer, however, that the elastomer be added to a mixture containing 15 to 35 parts by weight of alpha-methylstyrene to 85–65 parts by weight of methyl methacrylate. Best results have been obtained using the proportions shown in Example I above.

Other examples of the new interpolymers of the present invention follow. The polymerization cycle was the same as described in Example I unless otherwise stated.

*Example II*

Using the procedure of Example I, the following was prepared:

| | Parts |
|---|---|
| Methyl methacrylate | 75 |
| Alpha-methylstyrene | 25 |
| Benzoyl peroxide | 0.2 |
| Tertiary dodecyl mercaptan | 0.2 |
| Polymerized butadiene | 5 |

The unreacted monomer was removed in the same manner as Example I.

Compression molded test specimens of the interpolymer were prepared and tested in like manner to Example I with the following results:

| | |
|---|---|
| ASTM heat distortion | 112–116° C. |
| Notched Izod impact strength | 0.75–0.87 foot pounds per inch. |
| Light transmission, 550 millimicrons wave length through 1/16" sheet | 81–84 percent. |
| Specific gravity | 1.155. |
| Rockwell hardness | M 93–M 94. |

A 1/16 inch sheet was essentially transparent with a very slight yellow brown color. The sheet could be nailed without splitting.

The interpolymer was readily injection molded into test specimens which gave the following results:

| | |
|---|---|
| Notched Izod impact strength | 0.69±0.02 ft. lbs./in. |
| Flexural strength | 12,400±200 p.s.i. |

*Example III*

Using the same polymerization and unreacted monomer removal procedures as described in Examples I and II, the following was prepared:

| | Parts |
|---|---|
| Methyl methacrylate | 75 |
| Alpha-methylstyrene | 25 |
| Benzoyl peroxide | 0.2 |
| Tertiary dodecyl mercaptan | 0.2 |
| Copolymer of styrene and butadiene containing 12% bound styrene and having a Mooney viscosity of 52 | 10 |

Compression molded test specimens, according to Example I, gave the following results:

| | |
|---|---|
| ASTM heat distortion | 114.5–116.5° C. |
| Notched Izod impact strength | 1.14–1.15. |
| Light transmission | 65–66 percent. |
| Specific gravity | 1.155. |
| Rockwell hardness | M 81–M 85. |

A 1/16 inch sheet was essentially transparent with a brownish color. The sheet could be nailed without splitting.

Injection molded specimens gave the following properties:

| | |
|---|---|
| Notched Izod impact strength | 1.18±0.02 ft. lbs./in. |
| Flexural strength | 11,100±300 p.s.i. |

*Example IV*

Using the same procedures as described in Examples I–III, an interpolymer was made with the same styrene-butadiene copolymer used in Example III except that 20 parts of the copolymer was used. In addition, another interpolymer with 20 parts of polymerized butadiene was prepared.

Compression molded test specimens gave the following results:

| | Elastomer | |
|---|---|---|
| | 12% Styrene | All Butadiene |
| ASTM Heat Distortion | 105° C. | 97° C. |
| Notched Izod Impact Strength | 1.35 ft. lbs./in. | 1.60 ft. lbs./in. |
| Light Transmission | 58% | 54%. |
| Specific Gravity | 1.12 | 1.12. |
| Rockwell Hardness | M 56–M 57 | M 51–M 55. |

One-sixteenth inch thick sheets of each were fairly transparent.

*Example V*

Using the same procedures as in Examples I–IV, the following were polymerized:

| | Parts |
|---|---|
| Methyl methacrylate | 75 |
| Alpha-methylstyrene | 25 |
| Benzoyl peroxide | 0.2 |
| Tertiary dodecyl mercaptan | 0.2 |
| Copolymer of styrene and butadiene containing 23.5% bound styrene and having a Mooney viscosity of about 50 | 10 |

Two interpolymers were prepared using the above formulation, the only difference being in the method of preparation of the synthetic rubber. One was prepared by emulsion polymerization at 122° F. (a so-called "Hot Rubber") using a fatty acid soap, a persulfate catalyst and a carbamate shortstop. The other was a "Cold Rubber" prepared by emulsion polymerization at 43° F. using a 50/50 blend of rosin acid and acid soaps, a free radical type activation system, and a carbamate shortstop. Both are commercially available from many sources.

The two interpolymers had the following properties:

| | Interpolymer made With— | |
|---|---|---|
| | Hot Rubber | Cold Rubber |
| ASTM Heat Distortion, ° C | 111 | 110 |
| Notched Izod Impact Strength, ft. lbs./in | 1.04 | 1.03 |
| Transmission at 500 Millimicrons, Percent | 39 | 39 |

The 1/16 inch thick sheets showed fair transparency.

The data in the above example indicated that the properties of the interpolymer are practically independent of the method of preparation of the rubber used. Comparison between examples indicates that the major factors controlling properties of the interpolymers are the type and amount of rubber used.

The preparation of other interpolymers using varying amounts and kinds of elastomers reveals that the impact strength of the polymers increased as the proportions of butadiene in the elastomer increased. I prefer, therefore, for most purposes to use elastomers consisting essentially of polymerized butadiene.

Any of the known methods of polymerizing substances such as methyl methacrylate and alpha-methylstyrene may be used such as bulk polymerization as described in the above examples, solution polymerization in which the polymerization is carried out with the monomers dissolved in a solvent or emulsion or suspension polymerization in which the monomers are emulsified and suspended in an inert liquid. Various wetting and emulsifying agents may be added in such cases to perform their known function.

The impact strength of the interpolymers described hereinabove may run from two to six times the values of copolymers of methyl methacrylate and alpha-methylstyrene which have not been modified by the addition of an elastomer. This increase means that articles molded from the new interpolymers are much more resistant to breakage from blows and other sudden shocks. In addition, the resilience of the interpolymers was much improved so that considerable flexural deformation without fracture occurred. Another advantage is the fact that the interpolymers can be nailed which is a valuable feature for fabrication operations.

The new interpolymers of the present invention are also found to have a heat distortion point of 15–25 degrees higher than those found for other commercially available interpolymers of butadiene and methyl methacrylate, for instance.

The new polymers of the present invention have a relatively high light transmission which is an unexpected and important property of the new products.

These and other properties make these new interpolymers useful where a tough plastic is required such as shoe heels, machine parts, jigs and fixtures, separators, plastic pipe, machine housings, sight glasses and many other industrial applications.

As will be understood by those skilled in the art, small amounts of colors, fillers, plasticizers, and even reactants such as acrylonitrile and styrene may be added to the polymerization mixture to obtain special effects without, however, changing the essential character of the invention as described above.

I claim:

1. A composition of matter comprising an interpolymer, said interpolymer being the polymerization product of 1 to 55 parts by weight of alpha-methylstyrene, 99 to 45 parts by weight of methyl methacrylate, and 1 to 20 parts by weight of a rubbery butadiene polymer.

2. A composition of matter comprising an interpolymer, said interpolymer being the polymerization product of 85 to 65 parts by weight of methyl methacrylate, 15 to 35 parts by weight of alpha-methylstyrene, and 5 to 15 parts by weight of a rubbery butadiene polymer.

3. A composition of matter comprising an interpolymer, said interpolymer being the polymerization product of about 75 parts by weight of methyl methacrylate, about 25 parts by weight of alpha-methylstyrene, and about 10 parts by weight of a rubbery butadiene polymer.

4. A process of preparing interpolymers of methyl methacrylate, alpha-methylstyrene and rubbery butadiene polymers having a high impact strength and high heat distortion point, which comprises mixing together 1 to 55 parts by weight of alpha-methylstyrene, 99 to 45 parts by weigh tof methyl-methacrylate, 1 to 20 parts by weight of a rubbery butadiene polymer, and 0.01 to 0.8 part by weight of a free-radical polymerization catalyst and from about 0.01 to 2 parts by weight of a polymerization regulator of the group consisting of aliphatic mercaptans and organic disulfides of the formula R—S—S—R′ in which R and R′ are members of the group consisting of alkyl and aryl radicals of one to sixteen carbon atoms, and heating the mixture until polymerization is substantially complete.

5. A process in accordance with claim 4 in which the polymerization catalyst is benzoyl peroxide, the polymerization regulator is tertiary dodecyl mercaptan and the rubbery polymer is polymerized butadiene.

References Cited in the file of this patent
UNITED STATES PATENTS

| | | |
|---|---|---|
| 1,898,522 | Bock et al. | Feb. 21, 1933 |
| 2,802,808 | Hayes | Aug. 13, 1957 |
| 2,857,360 | Feuer | Oct. 21, 1958 |

FOREIGN PATENTS

| | | |
|---|---|---|
| 411,860 | Great Britain | June 13, 1934 |

OTHER REFERENCES

Boundy-Boyer: "Styrene," pages 700–701, published 1952, Reinhold, New York.